Figure 1:
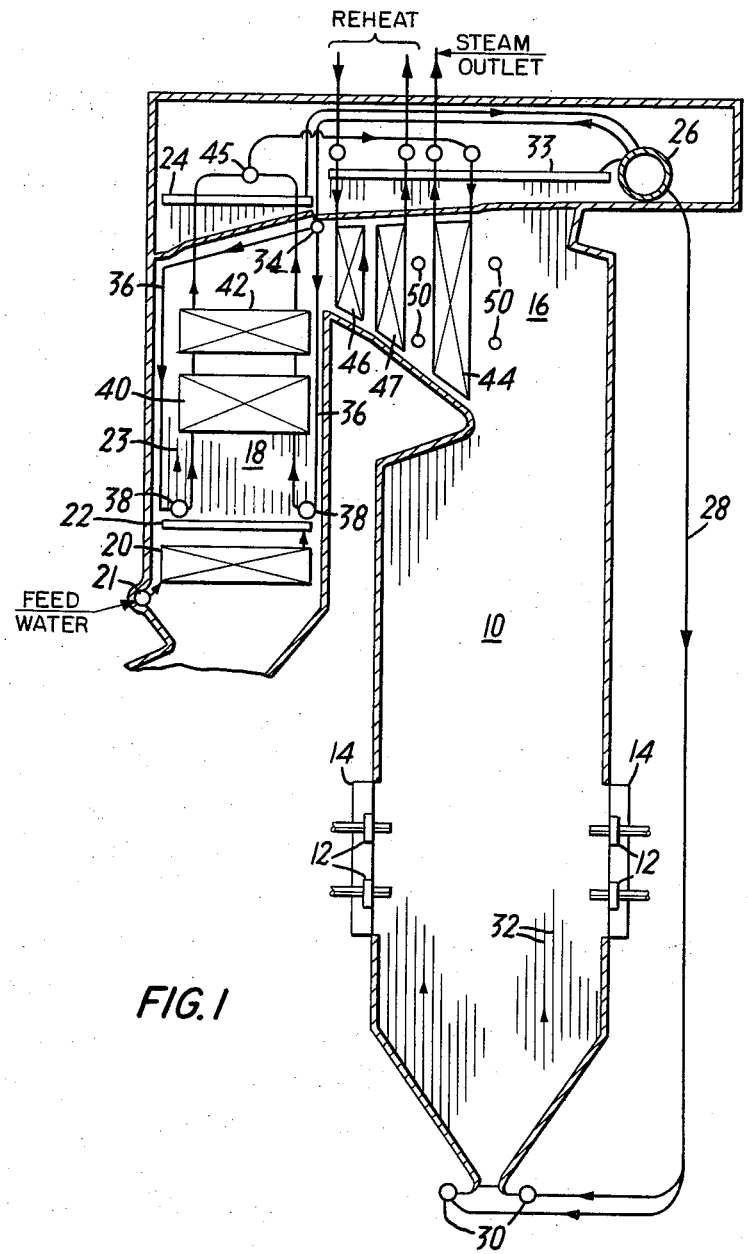

May 3, 1966
W. NELSON ETAL
ADDITIVE MIXTURES TO COMBAT HIGH TEMPERATURE CORROSION AND ASH BONDING DURING THE OPERATION OF FURNACES

Filed March 8, 1963

2 Sheets-Sheet 1

INVENTORS
WHARTON NELSON &
EDWARD SPENCER LISLE

BY their ATTORNEYS

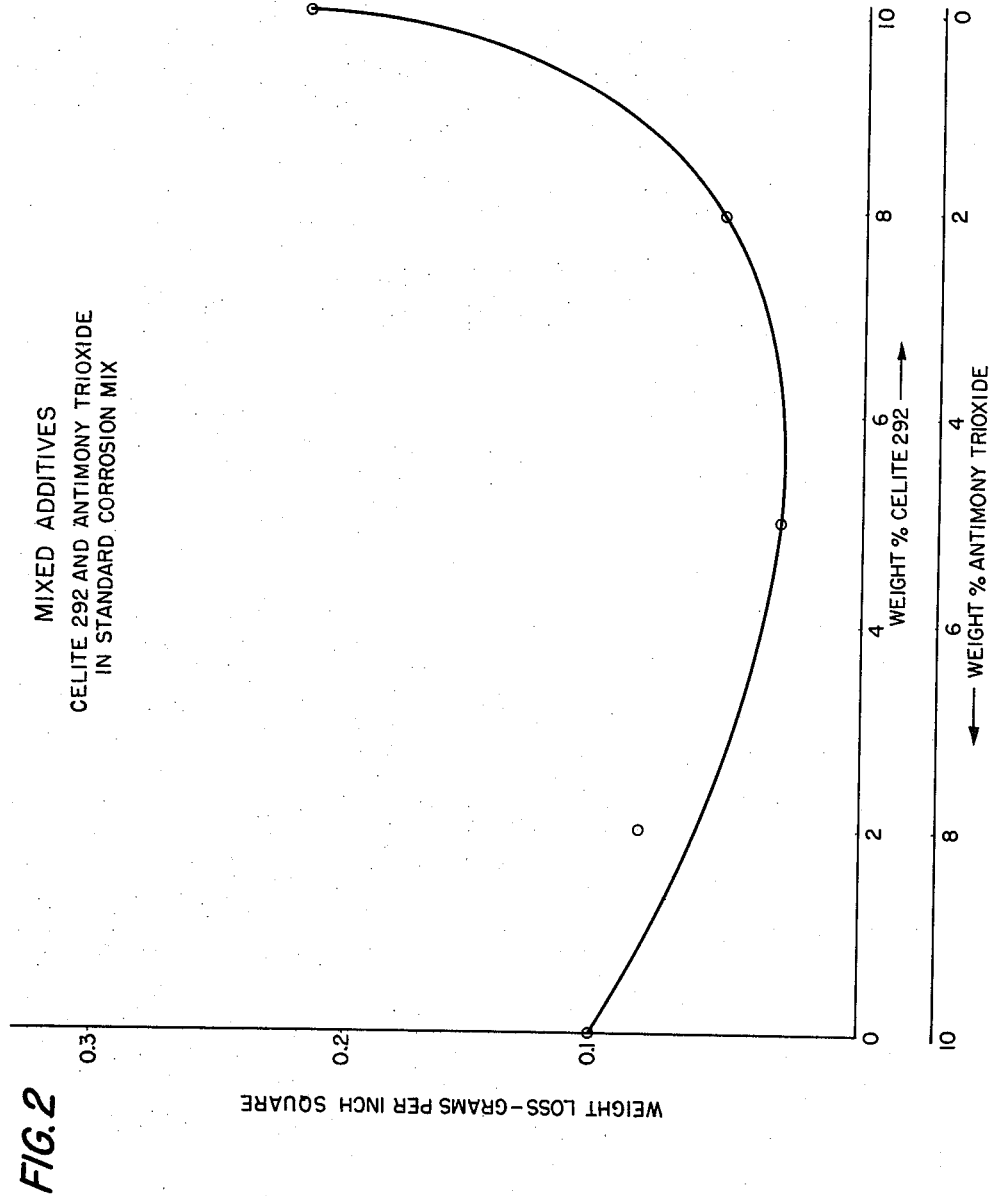

United States Patent Office 3,249,075
Patented May 3, 1966

3,249,075
ADDITIVE MIXTURES TO COMBAT HIGH TEMPERATURE CORROSION AND ASH BONDING DURING THE OPERATION OF FURNACES
Wharton Nelson, West Hartford, and Edward Spencer Lisle, Windsor, Conn., assignors to Combustion Engineering, Inc., Windsor, Conn., a corporation of Delaware
Filed Mar. 8, 1963, Ser. No. 265,008
13 Claims. (Cl. 110—1)

This is a continuation-in-part of our copending application Serial No. 244,116 filed December 12, 1962, now abandoned.

This invention relates to a method for improved furnace operation, and in particular to a method for reducing corrosion and fouling of heat transfer surfaces by ash deposits and sulfurous combustion products.

A problem of increasing importance in modern furnaces and high capacity steam generators in power plants is corrosion and fouling of tube surfaces due to the formation of a corrosive molten ash deposit. Formation of heavy deposits of ash by ash bonding is a particularly acute problem in furnaces where tube metal temperatures exceed 1000° F. It has been observed that a molten layer frequently develops adjacent to the tube surface which bonds other ash material to the tube, resulting in heavy ash deposits. The ash deposits are a serious detriment to the heat transfer capacity of the furnace, and furthermore, the molten layer is highly corrosive to tube metals.

Still another problem, long recognized in the art, is the formation of sulfur trioxide in the combustion gases. It is known that significant amounts of sulfur trioxide are formed by the catalytic conversion of sulfur dioxide to sulfur trioxide by fly ash. Sulfur trioxide tends to condense in the cooler sections of the heat exchangers as sulfuric acid, seriously limiting the heat economy obtainable. Further, it participates in the corrosion of other heat transfer surfaces.

As set forth in the copending application of Wharton Nelson, Serial No. 265,007, filed on March 8, 1963, corrosion and fouling can be suppressed by providing for the presence of antimony, antimony oxide, or materials which produce antimony oxides under furnace conditions. However, because of the relatively high expense of antimony compounds, it is desirable to provide a means of increasing the corrosion suppressing efficiency of the antimony compounds.

Accordingly, it is an object of this invention to provide a method of reducing ash bonding in furnaces.

It is a further object of this invention to provide a method of reducing corrosion in furnaces.

A particular object of this invention is to provide a method of reducing corrosion and fouling of tube surfaces having a temperature in excess of 1000° F.

It is a further object of this invention to provide a method of reducing corrosion by suppressing the formation of sulfur trioxide in furnaces.

It is another object of this invention to improve the corrosion retarding properties of antimony compounds.

According to the present invention, these and other objects are achieved by providing for the presence of a mixture in the combustion products of a furnace of antimony or an antimony compound with a siliceous mineral having a specific surface area of at least 10 square meters per gram. Also included within the method of the instant invention is contacting the high temperature tube surfaces with the mixture of antimony or an antimony compound with a siliceous material having a high specific surface area.

While antimony oxides are the preferred compounds, any material which will form antimony oxide under furnace conditions may be used. Such materials include, but are not limited to, antimony metal, antimony halides, antimony sulfides, stibnite, sodium antimonate and organic antimony compounds such as potassium antimony tartrate and other organo-antimony compounds. Antimony compounds, such as halides are highly reactive. When sprayed onto hot ash or tube surfaces or into the flue gas, they are probably almost instantly converted to the oxide at prevailing gas temperatures (approximately 1800° F.) in the furnace superheater area by the flue gas which contains about 4% uncombined oxygen.

All of the above mentioned antimony materials may be used to reduce corrosion in furnaces. Certain antimony compounds, however, are especially desirable since, in addition to reducing corrosion, these also reduce ash bonding on high temperature surfaces. Particular antimony compounds which retard both corrosion and ash bonding include antimony oxide and potassium antimony tartrate and sodium antimonate.

Siliceous materials which may be used include a wide variety of compositions. In general, silica or silica containing compounds may be used which have good adsorptive properties. As stated, the specific surface area should be at least 10 m.$^2$/gm.; however, improved results are obtained if the specific surface exceeds 15 m.$^2$/gm. Materials may be used having a specific surface as high as 1000 m.$^2$/gm. In addition to having good adsorptive properties, the siliceous material should be substantially non-catalytic with respect to the $SO_2$ to $SO_3$ reaction, and should preferably have one or more of the following properties:

(1) have a high thermal and structural stability of the additive particles when in an "as used" condition on the tubes.

(2) have a pH in a water suspension of the additive which is neutral, slightly acid or slightly alkaline.

(3) be non-fluxing and non-bonding with ash in flue gas when applied to boiler tubes, but retained by tube surface when applied as a slurry with fluid.

(4) be relatively non-soluble in fly ash or complex sulfates at prevailing use temperatures, and concurrently it should have little or no chemical reactivity with flue gases and complex sulfates.

(5) contain no water-soluble alkalies or halogens.

(6) be non-damaging to boiler materials like metals, refractories, etc.

(7) be in a fine state of division to enhance effectiveness.

(8) be effective for retarding corrosion (and bonding) when present in economically small proportions.

(9) be relatively non-volatile at use temperature.

(10) be non-toxic when either cold or hot.

Suitable minerals are, in general, silica and compounds of silica with at least one oxide selected from the group consisting of sodium oxide, potassium oxide, calcium oxide, magnesium oxide, titanium dioxide and aluminum oxide. Hydrated and non-hydrated minerals are included. Typical compounds include the hydrated aluminum silicates such as kaolin and bentonite, diatomaceous earths, calcium silicates, hydrated calcium silicates, magnesium silicates, hydrated magnesium silicates, aluminum silicates, colloidal silica, infusorial earths, synthetic diatomites, asbestos, mica, perlite, talc, Attapulgus clay, silicic acid, and silica gel.

The antimony-silica mixture may contain from 1% to in excess of 99% of the antimony compound and from 99% to below 1% of the siliceous material. The preferred composition contains at least from 20% to 60% antimony oxide and at least 80% to 40% of the siliceous material. Suitable mixtures may be prepared by a variety of methods. In the simplest embodiment, the antimony or antimony compound is dry blended with an appropriate amount of the siliceous material. It may be preferred to prepare a mixture of antimony oxide and the siliceous material contacting the antimony oxide in the vapor state with the siliceous material. The mixture thereby obtained is desirable because of its exceptional uniformity.

The mixture may be introduced by a wide variety of methods. Blowing a dust or slurry of the mixtures by the soot blowers into the superheater and reheater sections is particularly advantageous and is the preferred method of introduction. In still another method the high temperature tubes are precoated with the mixture. The amount of mixture which is required may vary widely, as corrosion and fouling in furnaces depend on the source of the fuel and the manner in which it is burned. Accordingly, it is not feasible to specify in advance the amount of mixture required under particular furnace conditions. The amounts of mixture used should be effective to reduce corrosion and/or ash bonding significantly.

While the present invention is particularly applicable to coal fired furnaces, it is not to be so limited. Corrosion and sulfur trioxide formation may be suppressed by the method of the present invention in oil fired furnaces as well as in furnaces fired by solid fuels such as coal and lignite.

For a better understanding of this invention, reference may be had to the accompanying figures and diagrams in which:

FIGURE 1 schematically illustrates a steam generator to which the present method may be applied; and FIGURE 2 shows laboratory measurements illustrating the practice of the present invention.

Referring to FIGURE 1, there is shown a typical steam generator having a combustion chamber 10 in which a solid fuel, such as pulverized coal, is burned. The fuel is introduced into the furnace by means of burners 12, while the combustion air enters through wind boxes 14. The combustion gases generated pass upwardly through the chamber 10, through the horizontal gas pass 16, down through the vertical gas pass 18, and out the lower end thereof to the stack (not shown).

Feed water is supplied, by means of a header 21, to the heat economizer 20 where the water is heated to a certain extent. The heated water then flows to a header 22, through the tubes 23 to the outlet header 24, and from there to the steam and water drum 26.

Water from drum 26 flows through a downcomer 28 to the lower headers 30 which supply water to the tubes 32 lining the walls of combustion chamber 10. Most of the steam generation occurs in tubes 32. Leaving the top of tubes 32 is a mixture of steam and water which is returned to the drum 26 by an upper header 33.

The steam separates from the water and flows on to distribution header 34. The steam passes from the header 34 down through tubes 36 to the supply headers 38, and then to the primary superheaters 40 and 42. The superheated steam then flows to the final superheater section 44 by way of the header 45, and from there to a turbine (not shown).

Many modern turbines are designed with a plurality of stages. In order to prevent condensation in the lower pressure stages, and further to obtain the highest possible thermal efficiency, partially expanded steam is withdrawn from the high pressure stages of the turbine and returned to the furnace to be reheated. The reheated steam is used to drive the lower pressure stages of the turbine. In the furnace illustrated in FIGURE 1, reheater passes 46 and 47 in the gas pass 16 are provided for this purpose.

In a furnace, such as illustrated, gas-side corrosion and fouling is most severe on the high temperature tubes of the superheater 44 and reheaters 46 and 47. Steam outlet temperatures from these tubes may be in the range of 1000° to 1200° F., and the tube metal temperatures may be as high as 1300° F. A substantial amount of the sulfur trioxide in the flue gas is formed in the superheater and reheater regions. A second zone where corrosion is important is in the economizer tubes 20. Because of the low temperatures existing in this region sulfur trioxide is condensed from the flue gases as liquid sulfuric acid.

In the preferred embodiment of the present invention the mixture of antimony and siliceous material is applied by blowing a suspension thereof through soot blowers 50 onto the tubes of the superheater 44 and reheater 47. Application is made as required by the furnace conditions.

By following the method of the instant invention the formation of corrosive molten ash deposits in the superheater 44 and reheaters 46 and 47 is suppressed. The reduction in fouling is a further important advantage accruing from the present invention. Additionally, by reducing the formation of $SO_3$, corrosion in other portions of the furnace, such as the heat economizer 20, which is the result of $SO_3$ in the flue gases, is also reduced.

Although the present invention is not to be limited by any theory, the following explanation is helpful in understanding the invention more fully and particularly in understanding the mechanism by which antimony oxide and potassium antimony tartrate improve the furnace operation. Ash and ash deposits in boilers have been extensively studied. Fly ash compositions normally have softening temperatures of over 1800° F. Typically, ash will consist of the oxides of silicon, iron, aluminum, alkali and alkaline earth metals. A portion of the alkali and alkaline earth metals is present as the sulfate; however in the usual case there are more than enough alkali and alkaline earth oxides present to react with the $SO_3$ in ash.

Ash deposits, by contrast, have a layered structure of a varying composition. The outermost portions of the deposit are friable and substantially like fly-ash. These comprise the mineral portions of the coal and its sulfurous reaction products. Underlying the outermost portion, and tightly bonded thereto, are a hard reddish layer and a soft, white, water-soluble material containing substantial amounts of $SO_3$ in excess of that required to react with the alkali and alkaline earth oxides present. It has been established that the excess sulfate is present as a complex sulfate of the formula

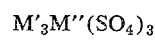

wherein $M'$ is sodium or potassium and $M''$ is iron or aluminum. Mixtures of the complex sulfates are molten at a temperature of 1000° F. to 1300° F. The complex sulfates are the principal molten compounds which bond the ash deposit to the tube surface. Immediately adjacent to the tube surface is a hard, black scale composed of oxide and sulfides. This scale represents the corrosion products resulting from the attack of the molten ash deposits on the tube metals.

Sulfur trioxide is normally present in the flue gas in small quantities (less than 0.005%). However, the gas phase concentration required for formation of complex sulfates according to the equation

is higher than obtained in ordinary flue gas (e.g., 0.025% $SO_3$ is required to form $K_3Fe(SO_4)_3$ at 1000° F.). Accordingly, it has been demonstrated that, under furnace conditions and in the absence of catalytic iron oxide, such sulfates will not form.

It is known that the iron oxide in the ash will catalytically convert $SO_2$ to $SO_3$. In the vicinity of the catalytic iron oxide, therefore, localized higher concentrations of $SO_3$ exist which are sufficient to permit the formation of complex sulfates.

For a further understanding and detailed explanation of the ash deposit structure and corrosion mechanism reference may be had to the paper by Wharton Nelson and Carl Cain, Jr., entitled, "Corrosion of Superheaters and Reheaters of Pulverized-Coal-Fired Boilers," Transactions of the ASME, July 1960, page 194, and the paper by Carl Cain, Jr., and Wharton Nelson entitled, "Corrosion of Superheaters and Reheaters of Pulverized-Coal-Fired Boilers II," Transactions of the ASME, October 1961, page 468.

As stated, it has been discovered that corrosion and the formation of molten ash deposits are suppressed by the presence of a mixture of an antimony compound and a siliceous material. The antimony is believed to poison the catalytic activity of the ash which is due principally to the presence of iron oxide $Fe_2O_3$. By inhibiting the formation of $SO_3$, the formation of the complex sulfates is suppressed. A corrosive ash deposit, therefore, does not form on the high temperature tube surfaces. A further beneficial result accruing from the catalyst poisoning activity of the antimony compounds is that the dew point of the flue gases is lowered. Accordingly, greater heat economy is possible.

The siliceous material while not poisoning the catalytic activity of the iron oxide, does act as an adsorbent. Molten complex sulfates formed are absorbed and thereby rendered harmless.

A further important advantage of the mixture is that the siliceous material stabilizes the somewhat volatile antimony oxides. It has been observed that the antimony compounds are less effective at temperatures over 1200° F. because they are volatilized from and oxidized on the surface of the catalytic $Fe_2O_3$. When mixed with a siliceous material, the mixture has materially improved corrosion suppressing activity at temperatures above 1200° F. While this invention is not to be limited by any theory, it is believed that the siliceous material adsorbs the antimony oxide and thereby retains it on the tube surfaces where it is effective to inhibit the conversion of $SO_2$ to $SO_3$.

The method according to the present invention is further illustrated by the following examples.

In order to determine the efficacy of corrosion retardants in tests of a reasonable time duration, corrosion conditions existing in a furnace such as illustrated in FIGURE 1 were simulated in laboratory scale equipment. A standard corrosion mixture consisting of iron oxide, sodium sulfate and potassium sulfate in a mole ratio of 1.0:1.5:1.5, respectively, was prepared. The corrosion mixture was placed in a suitable porcelain boat, and a test sample of stainless steel was immersed therein. The boat was then placed in a muffle furnace and heated to a temperature in the range of 1000° to 1300° F. A synthetic flue gas was prepared corresponding to the flue gas obtained when burning East Tennessee coal in the presence of 20% excess air. The gas is prepared by premixing oxygen, nitrogen, carbon dioxide and sulfur dioxide. The synthetic flue gas composition is set forth in Table I.

TABLE I

| Gas-component: | Volume percent |
|---|---|
| Carbon dioxide | 15 |
| Oxygen | 3.6 |
| Sulfur dioxide | 0.25 |
| Nitrogen | 81.15 |

This test substantially duplicates the formation of a corrosive molten ash deposit on boiler tubes by the catalytic conversion of $SO_2$ to $SO_3$ and the formation of corrosive complex sulfates from iron oxides and alkali sulfates as described above. Because the molten complex is much more concentrated in the laboratory test than it is in an actual boiler, its corrosiveness is increased by many fold. In the laboratory very substantial corrosion occurs in a period of ten days. By contrast in a typical boiler furnace complex sulfates do not exist in significant quantities for ten to twenty days, and a period of a month or more is required to obtain reliable measurements on corrosion.

In the laboratory test it was found that the flow rate of gas was a significant variable in affecting the formation of complex sulfates. A series of tests showed that a low flow rates the complex sulfate formation was slow but as the flow rate was increased to about 250 to 300 ml./min. in the 1" diameter tubes and used in the muffle furnaces, the rate of sulfate formation stabilized. Throughout the examples hereinafter described, a flow rate of 300 ml./min. was used, at which rate the sulfate formation was substantially unaffected by small errors in flow rate measurement.

*Example I*

Using the foregoing procedure, the corrosion of type 321 stainless steel was measured using various mixtures of Celite 292 and antimony trioxide. Celite 292 is a diatomaceous earth filter aid sold commercially by the Johns Manville Co., and has a specific surface area of 15–25 m.$^2$/gm. Corrosion measurements were made using the above described standard corrosion mix plus 10% of the corrosion retarding additive based on the weight of the corrosion mix. The amount of corrosion was measured after 10 days with the sample at 1100° F. The data obtained are shown graphically in FIGURE 2.

As noted above, the corrosion rate in a furance depends on the fuel and the manner in which it is burned. The amount of antimony required in the corrosive molten ash layer in a particular case to inhibit corrosion effectively may be conveniently estimated by the foregoing laboratory test. In testing the corrosiveness of a given ash, the iron oxide of the standard corrosion mix is replaced by an equal weight of ash from the fuel to be burned. The antimony/ash ratio should be sufficient to reduce the corrosiveness of the ash-sulfate mixture to less than 50% of the value observed when a tube metal sample is tested in a plain ash-sulfate mixture during a ten day corrosion test.

As described above, the ash deposit has a layered structure, the complex sulfates occurring principally in the inner layers. The corrosion retarding mixture is preferably concentrated in these layers to achieve maximum effectiveness. However, even that mixture in deposits further removed from the tube may have some effect in reducing corrosion.

*Example II*

A test was made using the foregoing procedure to show the corrosion retarding activity of a mixture of 60% Celite 292 and 40% antimony at high temperatures. A standard corrosion mix was prepared, and the antimony-Celite 292 mixture was added to it in an amount of 5% by weight of the corrosion mixture. In a ten day test at 1275° F. a corrosion rate of 0.59 gm./in.$^2$ was observed on a type 321 stainless steel. This compared with a corrosion rate of 2.96 gm./in.$^2$ in a comparable test without the use of the antimony-Celite 292 mixture at 1250° F. The corrosion rate of a blank at 1275° F. is expected to be in excess of 3 gm./in.$^2$.

In regard to both of the examples set forth immediately above, over most of the range of additive-mixture compositions herein disclosed it has been noted as a concomitant advantage along with corrosion reduction that a substantial decrease in bond strength of the ash deposits also is realized.

The foregoing examples are for illustrative purposes only, and the invention is not to be limited except by the following claims.

We claim:

1. A method for improving furnace operation comprising providing for the presence in the combustion products in said furnace of a mixture comprising from 1% to 99% based on the weight of said mixture of (A) a material selected from the group consisting of antimony, antimony oxides and compounds which produce antimony oxides under furnace conditions and from 99% to 1% based on the weight of said mixture of (B) a siliceous material selected from the group consisting of silica and compounds of silica with at least one oxide selected from the group consisting of sodium oxide, potassium oxide, calcium oxide, magnesium oxide, titanium dioxide and aluminum oxide said siliceous material being substantially noncatalytic with respect to the conversion of $SO_2$ to $SO_3$ and having a surface area of at least 10 square meters per gram.

2. A method of reducing the corrosion of high temperature surfaces by combustion products comprising contacting said surfaces with a mixture comprising from 1% to 99% based on the weight of said mixture of (A) a material selected from the group consisting of antimony, antimony oxides and compounds which produce antimony oxides under furnace conditions and from 99% to 1% based on the weight of said mixture of (B) a siliceous material selected from the group consisting of silica and compounds of silica with at least one oxide selected from the group consisting of sodium oxide, potassium oxide, calcium oxide, magnesium oxide, titanium dioxide and aluminum oxide said siliceous material being substantially noncatalytic with respect to the conversion of $SO_2$ to $SO_3$ and having a surface area of at least 10 square meters per gram.

3. A method of reducing the corrosion of high temperature surfaces by combustion products comprising applying to said surfaces a mixture comprising from 1% to 99% based on the weight of said mixture of (A) a material selected from the group consisting of antimony, antimony oxides and compounds which produce antimony oxides under furnace conditions and from 99% to 1% based on the weight of said mixture of (B) a siliceous material selected from the group consisting of silica and compounds of silica with at least one oxide selected from the group consisting of sodium oxide, potassium oxide, calcium oxide, magnesium oxide, titanium dioxide and aluminum oxide said siliceous material being substantially non-catalytic with respect to the conversion of $SO_2$ to $SO_3$ and having a surface area of at least 10 square meters per gram.

4. A method of improving furnace operation comprising providing for the presence in the combustion products in said furnace of a mixture comprising from 20% to 60% based on the weight of said mixture of (A) a material selected from the group consisting of antimony, antimony oxides and compounds which produce antimony oxides under furnace conditions and from 80% to 40% based on the weight of said mixture of (B) a siliceous material selected from the group consisting of silica and compounds of silica with at least one oxide selected from the group consisting of sodium oxide, potassium oxide, calcium oxide, magnesium oxide, titanium dioxide, and aluminum oxide, said siliceous material being substantially non-catalytic with respect to the conversion of $SO_2$ to $SO_3$ and having a surface area of at least 10 square meters per gram.

5. A method of improving furnace operation comprising providing for the presence in the combustion products in said furnace of a mixture comprising from 1% to 99%, based on the weight of said mixture, of (A) at least one material selected from the group consisting of antimony, antimony halides, antimony sulfides, stibnite, sodium antimonate and potassium antimony tartrate, and from 99% to 1%, based on the weight of said mixture of (B) at least one siliceous material selected from the group consisting of hydrated aluminum silicates, diatomaceous earths, calcium silicates, hydrated calcium silicates, magnesium silicates, hydrated magnesium silicates, aluminum silicates, colloidal silica, infusorial earths, synthetic diatomites, asbestos, mica, perlite, talc, Attapulgus clay, silicic acid and silica gel, said siliceous material having a surface area of at least 10 square meters per gram.

6. A method of improving furnace operation comprising providing for the presence in the combustion products in said furnace of a mixture comprising from 20% to 60%, based on the weight of said mixture, of (A) at least one siliceous material selected from the group consisting of antimony, antimony halides, antimony sulfides, stibnite, sodium antimonate and potassium antimony tartrate, and from 80% to 40%, based on the weight of said mixture, of (B) at least one siliceous material selected from the group consisting of hydrated aluminum silicates, diatomaceous earths, calcium silicates, hydrated calcium silicates, magnesium silicates, hydrated magnesium silicates, aluminum silicates, colloidal silica, infusorial earths, synthetic diatomites, asbestos, mica, perlite, talc, Attapulgus clay, silicic acid, and silica gel, said siliceous material having a surface area of at least 10 square meters per gram.

7. A method of improving furnace operation comprising providing for the presence in the combustion products in said furnace of a mixture containing about 40% antimony trioxide and about 60% of a diatomaceous earth having a surface area of at least 15 square meters per gram.

8. In a furnace having surfaces at temperatures between about 1000° and 1300° F. which are subject to accumulations of corrosive ash deposits, a method of reducing the corrosion on said surfaces comprising applying to said surfaces a corrosion retarding mixture consisting essentially of from 1% to 99% based on the weight of said mixture of (A) a material selected from the group consisting of antimony, antimony oxides and compounds which produce antimony oxides under furnace conditions and from 99% to 1% based on the weight of said mixture of (B) a siliceous material selected from the group consisting of silica and compounds of silica with at least one oxide selected from the group consisting of sodium oxide, potassium oxide, calcium oxide, magnesium oxide, titanium dioxide and aluminum oxide, said siliceous material being substantially non-catalytic with respect to the conversion of $SO_2$ to $SO_3$ and having a surface area of at least 10 square meters per gram.

9. In a furnace having surfaces at temperatures between about 1000° and 1300° F. subject to the accumulation of molten ash deposits, a method of improving the furnace operation comprising providing for the presence in the combustion products in said furnace of a mixture consisting essentially of from about 20% to about 60% based on the weight of said mixture of (A) a material selected from the group consisting of antimony, antimony oxides and compounds which produce antimony oxides under furnace conditions and from 80% to 40% based on the weight of said mixture of (B) a siliceous material selected from the group consisting of silica and compounds of silica with at least one oxide selected from the group consisting of sodium oxide, potassium oxide, calcium oxide, magnesium oxide, titanium dioxide, and aluminum oxide, said siliceous material being substantially non-catalytic with respect to the conversion of $SO_2$ to $SO_3$ and having a surface area of at least 10 square meters per gram.

10. In a furnace having surfaces at temperatures between about 1000° and 1300° F. subject to the accumulation of molten ash deposits, a method of improving furnace operations comprising providing for the presence in the combustion products in said furnace of a mixture consisting essentially of about 40% antimony trioxide and about 60% of a diatomaceous earth having a surface area of at least 15 square meters per gram.

11. In a furnace burning solid fuels having surfaces at temperatures between about 1000° and 1300° F. which are subject to accumulation of corrosive ash deposits, a method of reducing corrosion comprising injecting into said furnace immediately adjacent to and upstream of said surfaces a mixture consisting essentially of from about 1% to about 99% based on the weight of said mixture of (A) a material selected from the group consisting of antimony, antimony oxides and compounds which produce antimony oxides under furnace conditions and from 99% to 1% based on the weight of said mixture of (B) a siliceous material selected from the group consisting of silica and compounds of silica with at least one oxide selected from the group consisting of sodium oxide, potassium oxide, calcium oxide, magnesium oxide, titanium dioxide and aluminum oxide, said siliceous material being substantially non-catalytic with respect to the conversion of $SO_2$ to $SO_3$ and having a surface area of at least 10 square meters per gram.

12. In a furnace burning solid fuels having surfaces at temperatures between about 1000° and 1300° F. which are subject to the accumulation of molten ash deposits, a method of improving furnace operation comprising injecting into said furnace immediately adjacent to and upstream of said surfaces a mixture comprising from 20% to 60% based on the weight of said mixture of (A) a material selected from the group consisting of antimony, antimony oxides and compounds which produce antimony oxides under furnace conditions and from 80% to 40% based on the weight of said mixture of (B) a siliceous material selected from the group consisting of silica and compounds of silica with at least one oxide selected from the group consisting of sodium oxide, potassium oxide, calcium oxide, magnesium oxide, titanium dioxide, and aluminum oxide, said siliceous material being substantially non-catalytic with respect to the conversion of $SO_2$ to $SO_3$ and having a surface area of at least 10 square meters per gram.

13. In a coal-fired furnace having surfaces at temperatures between about 1000° and 1300° F. which are subject to accumulations of molten ash deposits, a method of improving furnace operation comprising injecting into said furnace immediately adjacent to and upstream of said surfaces a mixture containing about 40% antimony trioxide and about 60% of a diatomaceous earth having a surface area of at least 15 square meters per gram.

References Cited by the Examiner

UNITED STATES PATENTS

| 2,673,145 | 3/1954 | Chandler | 110—1 |
| 2,935,956 | 5/1960 | Welch | 110—1 |

FOREIGN PATENTS

| 705,176 | 3/1954 | Great Britain. |
| 728,812 | 4/1955 | Great Britain. |

FREDERICK KETTERER, *Primary Examiner.*

JAMES W. WESTHAVER, *Examiner.*